(12) United States Patent
Hoppe et al.

(10) Patent No.: US 8,263,509 B2
(45) Date of Patent: Sep. 11, 2012

(54) GLASS-CERAMIC CONTAINING NANOSCALE BARIUM TITANATE AND PROCESS FOR THE PRODUCTION THEREOF

(75) Inventors: Bernd Hoppe, Ingelheim (DE); Daniela Seiler, Alzey (DE); Bernd Ruedinger, Woerrstadt (DE); Ina Mitra, Stadecken-Elsheim (DE); Maria-Louisa Reich, Frankfurt am Main (DE); Martin Letz, Mainz (DE); Michael Kluge, Offenbach A.M. (DE)

(73) Assignee: Schott AG, Mainz (DE)

( * ) Notice: Subject to any disclaimer, the term of this patent is extended or adjusted under 35 U.S.C. 154(b) by 33 days.

(21) Appl. No.: 12/793,834

(22) Filed: Jun. 4, 2010

(65) Prior Publication Data

US 2011/0028298 A1    Feb. 3, 2011

(30) Foreign Application Priority Data

Jun. 4, 2009   (DE) .......................... 10 2009 024 645

(51) Int. Cl.
*C03C 10/02*   (2006.01)
(52) U.S. Cl. ....................................... 501/10; 361/321.4
(58) Field of Classification Search .................... 501/10, 501/137, 138, 139; 361/321.4
See application file for complete search history.

(56) References Cited

U.S. PATENT DOCUMENTS

| 3,615,757 A * | 10/1971 | Herczog et al. .................. 501/10 |
| 4,870,539 A * | 9/1989 | Chance et al. ............. 361/321.5 |
| 2009/0215605 A1 | 8/2009 | Letz et al. |

FOREIGN PATENT DOCUMENTS

| DE | 10 2008 011 206 A1 | 9/2009 |
| JP | 11-288852 A | 10/1999 |

OTHER PUBLICATIONS

Herczog "Microcrystalline BaTiO3 by Crystallization From Glass", J. Am.Cer. Soc., Mar. 21, 1964, vol. 47, No. 3.*
McCauley et al "Intrinsic Size Effects in a Barium Titanate Glass Ceramic", J. Am. Cerm. Soc., 81 [4] 479-487 (1998).*

* cited by examiner

*Primary Examiner* — Karl Group
(74) *Attorney, Agent, or Firm* — Harness, Dickey & Pierce, P.L.C.

(57) ABSTRACT

A process for the production of a glass-ceramic comprises the following steps:

a) providing a mixture comprising at least $SiO_2$, $Al_2O_3$, BaO and $TiO_2$,
b) melting the mixture in order to produce a glass phase,
c) cooling the glass phase, and
d) ceramicizing the glass phase. In the process, the glass phase is heated over the course of at most 5 minutes, preferably over the course of at most 3 minutes, to a temperature in the region of the crystallization temperature of $Ba_{1-x}Z^1_xTi_{1-y}Z^2_yO_3$, whereby $Z^1$ is an element selected from the group consisting of Sr, Ca, Ce, Pb, La and Sm, whereby $Z^2$ is an element selected from the group consisting of Zr, Hf, Nb, V, Y, Sc and Ta, and whereby x and y are each independently of one another $0 \leq x,y \leq 0.5$, preferably $0 \leq x,y \leq 0.1$, but substantially below the crystallization temperature of $Ba[Al_2Si_2O_8]$.

18 Claims, 11 Drawing Sheets

GLASS-CERAMIC CONTAINING NANOSCALE BARIUM TITANATE AND PROCESS FOR THE PRODUCTION THEREOF

CROSS REFERENCES TO RELATED APPLICATIONS

This application claims priority from German patent application 10 2009 024 645.2, filed on Jun. 4, 2009. The entire content of this priority application is incorporated herein by reference.

BACKGROUND OF THE INVENTION

The present invention relates to a glass-ceramic, a process for the production of a glass-ceramic as well as electronic components comprising a dielectric.

There is currently an increasing need for energy storage for times ranging from microseconds to days and a large amount of electrical energy. If the energy stores used in this context are to be quick to charge or discharge, electrical capacitors are often used for this purpose. Capacitors of this type require materials having special dielectric properties. Of particular interest in this context are a high breakdown voltage and, in order to obtain a high storage density, also a high dielectric constant, preferably in combination with a flat temperature profile, in order to make it possible to use the capacitor in a broad temperature range.

In the prior art, polypropylene films are generally used as the dielectric, particularly for high performance capacitors. However, the dielectric breakdown voltage of about 1 V/cm for a dielectric of this type limits the density with which energy can be stored.

In order to increase the storage density electrolytic capacitors, for example, have been proposed. Jeol in Japan has announced a dual-layer electrolytic capacitor having a storage density in the order of magnitude of 20 Wh/l (JP 11288852 A2). However, the electrolytes used as the dielectric in capacitors of this type are generally chemically reactive, and harmful to the environment and, in some cases, can even be explosive.

It is further known to use glasses as the dielectric, e.g. for capacitors. Capacitors which use glass as the dielectric are, however, often complicated to produce and accordingly expensive.

It is furthermore known to use ceramic materials, in particular also Ba—TiO$_3$ ceramics, as the dielectric. In this case, however, the dielectric breakdown voltage of ceramics is limited by their residual porosity.

SUMMARY OF THE INVENTION

It is therefore an object of the present invention to specify a material having improved dielectric properties, in particular a high breakdown voltage and a high dielectric constant, preferably in combination with a flat temperature profile, as well as a process for the production of said material and electrical components using said material.

According to the invention, the object is achieved by a glass-ceramic comprising, as main crystalline phase, a perovskite phase of the following formula: $Ba_{1-x}Z^1_xTi_{1-y}Z^2_yO_3$, in which $Z^1$ is an element selected from the group consisting of Sr, Ca, Ce, Pb, La and Sm, in which $Z^2$ is an element selected from the group consisting of Zr, Hf, Nb, V, Y, Sc and Ta, and in which x and y are each independently of one another $0 \leq x,y \leq 0.5$, preferably $0 \leq x,y \leq 0.1$, whereby size of the crystallites is in the range of 10 nm to 50 µm, preferably of 100 nm to 1 µm.

The object is further achieved by a process for the production of a glass-ceramic, comprising the following steps:
a) providing a mixture comprising at least SiO$_2$, Al$_2$O$_3$, BaO and TiO$_2$,
b) melting the mixture in order to produce a glass phase,
c) cooling the glass phase, and
d) ceramicizing the glass phase, whereby the glass phase is heated over the course of at most 5 minutes, preferably over the course of at most 3 minutes, to a temperature in the region of the crystallization temperature of $Ba_{1-x}Z^1_xTi_{1-y}Z^2_yO_3$, whereby $Z^1$ is an element selected from the group consisting of Sr, Ca, Ce, Pb, La and Sm, whereby $Z^2$ is an element selected from the group consisting of Zr, Hf, Nb, V, Y, Sc and Ta, and whereby x and y are each independently of one another $0 \leq x,y \leq 0.5$, preferably $0 \leq x,y \leq 0.1$, but substantially below the crystallization temperature of Ba[Al$_2$Si$_2$O$_8$].

The object is further achieved by an electronic component comprising a dielectric, whereby the dielectric contains a glass-ceramic according to the invention. This component is preferably a component selected from the group consisting of the capacitors, the frequency filters and the antennas and is, in particular, a high-performance capacitor.

Within the context of the invention, a glass-ceramic is understood to be a material obtained via a homogeneous melt. This melt is super cooled into a glass-like state in order to form a glass, and, in a second step independent of the first heating step, the glass is treated with a precisely defined temperature profile over time, in order to enable the controlled growth of crystals in the glass.

In this context, the crystallization temperatures of $Ba_{1-x}Z^1_xTi_{1-y}Z^2_yO_3$ and Ba[Al$_2$Si$_2$O$_8$] can be determined using standard processes known to a person skilled in the art such as differential thermoanalysis (DTA) or temperature-dependent X-ray diffraction.

It has been found that the process according to the invention can be used to produce glass-ceramics, in which $Ba_{1-x}Z^1_xTi_{1-y}Z^2_yO_3$ crystallites having a size in the nanometre range are incorporated in a continuous glass phase in a dense and pore-free manner. The lack of pores means that the glass-ceramic of the invention has an increased breakdown voltage, e.g. compared to porous ceramics. In addition, the size of these crystallites means that virtually every individual $Ba_{1-x}Z^1_xTi_{1-y}Z^2_yO_3$ crystallite forms an individual ferroelectric domain which can reorient itself in an external electric field through very small thermal fluctuations. This results in very high dielectric constants and is also referred to as a superparaelectric effect. In addition, the temperature dependence of the dielectric constant is also relatively flat, since the presence of small crystallites having diameters in the region of the ferroelectric domains blurs the otherwise sharp electric transitions when the crystal structure changes as a result of temperature.

Furthermore, the present process also makes it possible to reduce, if not even completely prevent, the formation of other, undesirable crystallites, such crystallites of Ba[Al$_2$Si$_2$O$_8$], also referred to as Ba-celsian, or of BaTi$_2$Si$_2$O$_8$, also referred to as fresnoite.

The glass-ceramics which can be produced, for example, according to the above-mentioned process and have been found by the present inventors thus form materials which are outstandingly suitable for use in electrical components and, in particular on account of the high dielectric constant, can be used with preference in capacitors and, in particular, in high-performance capacitors.

In the present process, the glass produced in steps b) and c) is heated over the course of a very short time, in particular over the course of at most 5 minutes and preferably over the course of at most 3 minutes, to a temperature in the region of the crystallization temperature of $Ba_{1-x}Z^1_xTi_{1-y}Z^2_yO_3$, which usually lies in the range of about 800 to 880° C. In this context, the glass does not necessarily have to be heated completely to the crystallization temperature in the process. The crystallization of $Ba_{1-x}Z^1_xTi_{1-y}Z^2_yO_3$ already begins to set in at a temperature below the actual crystallization temperature, this involving an exothermic process, such that the heat still required to reach the crystallization temperature can be produced by the crystallization of the $Ba_{1-x}Z^1_xTi_{1-y}Z^2_yO_3$.

Here, it is particularly preferable to avoid heating the glass completely to the crystallization temperature of $Ba_{1-x}Z^1_xTi_{1-y}Z^2_yO_3$, in order to prevent the temperature of the glass from overshooting the crystallization temperatures of undesirable crystallites, which may result from the evolution of heat during the crystallization of $Ba_{1-x}Z^1_xTi_{1-y}Z^2_yO_3$.

In this case, it should also be noted that although it is preferable, in the process of the invention, for the glass to remain below the crystallization temperature of $Ba[Al_2Si_2O_8]$ at all times, it is also possible for this temperature to be exceeded locally limited within the glass or briefly, in so far as this does not result in an excessive crystallization of $Ba[Al_2Si_2O_8]$.

In one embodiment of the process, the mixture in step a) comprises at least the following:
  10-20 mol % $SiO_2$,
  0-10 mol % $Al_2O_3$,
  30-45 mol % $BaO$,
  30-40 mol % $TiO_2$.

It has been found that the use of a mixture of the above-mentioned oxides in the above-mentioned quantitative ratios can produce glass-ceramics having a particularly high dielectric constant and a particularly advantageous temperature profile.

In a further embodiment of the invention, the mixture in step a), or the glass-ceramic, further comprises at least one oxide selected from the group consisting of $Sb_2O_3$, $As_2O_3$ and $Bi_2O_3$.

It has been found that the addition of the above-mentioned oxides makes it possible to enlarge the difference in the crystallization temperatures between $Ba_{1-x}Z^1_xTi_{1-y}Z^2_yO_3$ and $Ba[Al_2Si_2O_8]$, and therefore it becomes easier to specifically crystallize out the $Ba_{1-x}Z^1_xTi_{1-y}Z^2_yO_3$ desired according to the invention as opposed to the $Ba[Al_2Si_2O_8]$, making it easier to carry out the process and resulting in a higher-quality glass-ceramic.

In one embodiment of the above-mentioned measure, the mixture in step a), or the glass-ceramic, comprises 0.01 to 3 mol %, preferably 0.1 to 1 mol %, and particularly preferably 0.1 to 0.5 mol % of the at least one oxide selected from the group consisting of $Sb_2O_3$, $As_2O_3$ and $Bi_2O_3$.

It has been found that the addition of the above-mentioned quantities of $Sb_2O_3$, $As_2O_3$ or $Bi_2O_3$ makes it possible to effectively enlarge the temperature difference between the crystallization temperature of the desired $Ba_{1-x}Z^1_xTi_{1-y}Z^2_yO_3$ and the crystallization temperature of the undesired $Ba[Al_2Si_2O_8]$, without negatively effecting the quality of the resulting glass-ceramic and without having to use excessive quantities of possibly harmful oxides.

In a further embodiment of the invention, the mixture in step a), or the glass-ceramic, further comprises at least one oxide selected from the group consisting of $P_2O_5$ and $B_2O_3$.

The addition of $P_2O_5$ or $B_2O_3$ is advantageous since these act as glass-forming agents and thus promote the formation of a homogeneous glass phase.

In a further embodiment of the process of the invention, the mixture in step a) further comprises at least one oxide of an element selected from the group consisting of Sr, Ca, Ce, Pb, La, Sm, Zr, Hf, Nb, V, Y, Sc and Ta.

It has been found that the addition of oxides of the above-mentioned elements makes it possible to influence the electrical properties of the glass-ceramics produced according to the process of the invention, in order to match the latter even better to the desired end use.

In a further embodiment of the process of the invention, the ceramicization in step d) takes place using an IR radiator and, in particular, under PID control with the aid of a pyrometer.

It has been found that the rapid heating of the glass phase in step d) of the process according to the invention can be achieved particularly effectively using an IR radiator, whereby an especially precise temperature control is made possible by using PID control with the aid of a pyrometer.

In a further embodiment of the invention, the glass phase, during the ceramicization in step d), after heating is held for a period of 1 minute to 1 hour at a temperature in the region of the crystallization temperature of $Ba_xZ^1_{1-x}Ti_yZ^2_{1-y}O_3$.

It has been found that the crystal growth in the glass phase is influenced positively and particularly high-quality glass-ceramics are obtained by holding the temperature in the region of the crystallization temperature for 1 minute to 1 hour.

In a further embodiment of the glass-ceramic of the invention, the volumetric content η of the perovskite phase is $0.3 \leq \eta \leq 0.95$.

It has been found that a glass-ceramic having particularly good electrical but also mechanical properties can be obtained if the $Ba_{1-x}Z^1_xTi_{1-y}Z^2_yO_3$ perovskite phase is present in the above-mentioned quantities.

In a further embodiment, the glass-ceramic of the invention has a dielectric constant of $\in'>4000$, preferably of $\in'>6000$ and particularly preferably of $\in'>8000$.

In a further embodiment, the glass-ceramic of the invention has a dielectric loss angle at 10 kHz of $\tan \delta < 5 \cdot 10^{-2}$, preferably of $\tan \delta < 2 \cdot 10^{-2}$.

In a further embodiment, the glass-ceramic of the invention has a dielectric strength given a thickness of 100 μm of >20 kV/mm, preferably of >100 kV/mm.

Glass-ceramics having the above-mentioned properties are particularly well-suited for use in high-performance capacitors.

It goes without saying that the features of the invention mentioned above, and those still to be explained below, can be used not only in the combination given in each case but also in other combinations or on their own, without departing from the scope of the present invention.

BRIEF DESCRIPTION OF THE DRAWINGS

Further features and advantages of the invention are apparent from the following description of preferred exemplary embodiments, with reference to the drawings, in which:

FIG. 2 a) to c) show differential thermoanalysis (DTA) graphs for the glasses produced according to Examples 1 to 3;

FIGS. 9 *a*) and *b*) show graphs in which the dielectric constant is plotted against temperature for the glass-ceramic of Example 4 and a BaTiO$_3$ single crystal respectively.

DESCRIPTION OF PREFERRED EMBODIMENTS

Figure 1:
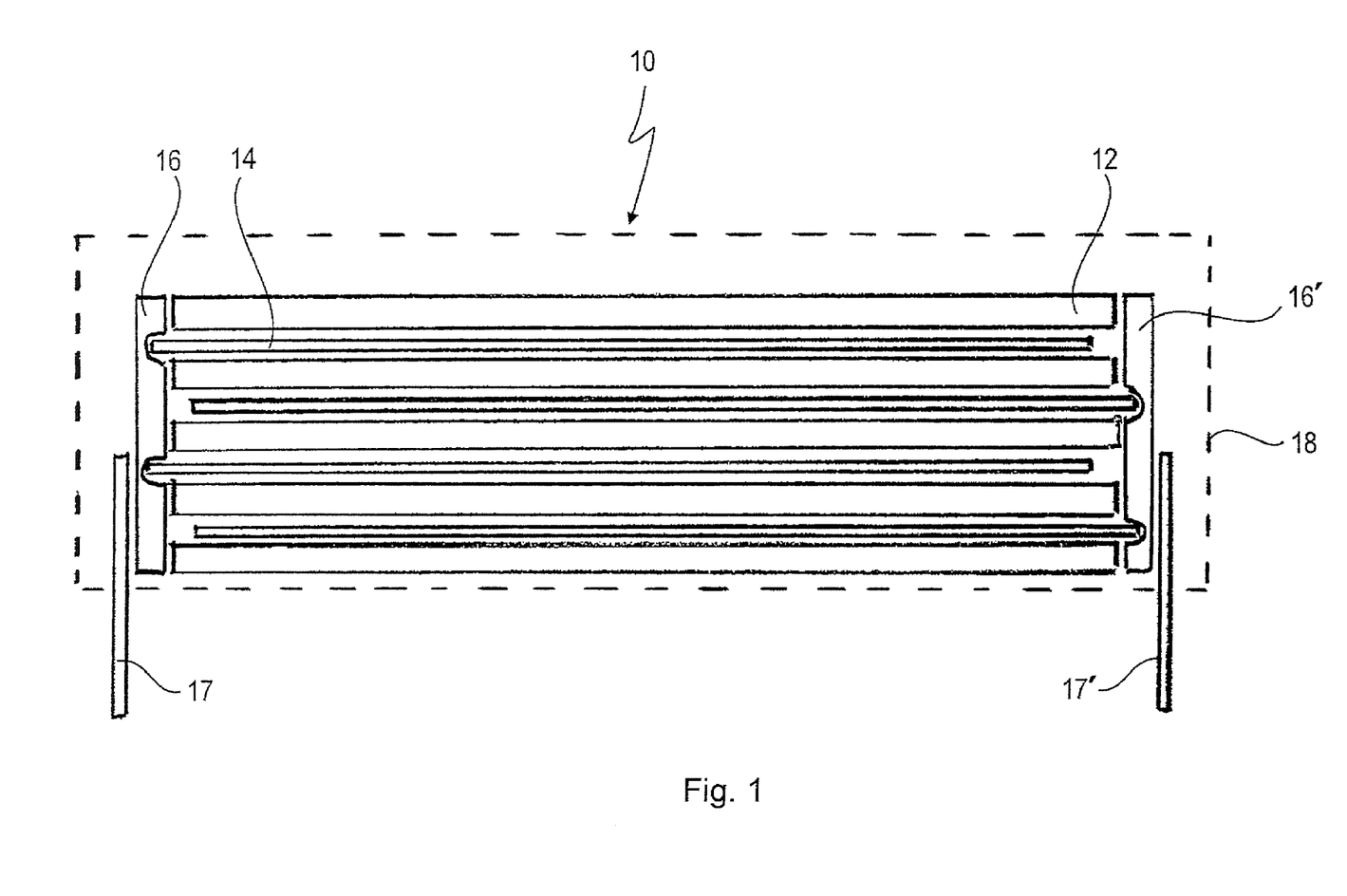
FIG. 1 is a schematic view of a capacitor.

In FIG. 1, a ceramic capacitor is denoted in its entirety by reference numeral 10. In a capacitor 10 of this type, there is a respective alternating arrangement of a dielectric in the form of glass-ceramic plates, one of these being denoted here by way of example with reference numeral 12, and electrodes in the form of metal foils, one of which is denoted here by way of example with reference numeral 14. The metal foils 14 each project in alternating fashion beyond one of the two sides of the stack of glass-ceramic plates 12, where they are electrically connected to one another via electrical contacts 16, 16'. Electrical connections 17 and 17', by means of which the capacitor 10 can for example be connected to a printed circuit board, are then correspondingly arranged in each case at the contacts 16 and 16'. Owing to its structure, a capacitor 10 of this type is also referred to as a layered capacitor. The assembly comprising glass-ceramic plates 12 and metal foils 14 is preferably additionally surrounded by a housing 18, which is shown here merely by dashed lines and can be formed, for example, by pouring the stack into a synthetic resin.

EXAMPLES

Examples 1 to 3

Figure 2A:
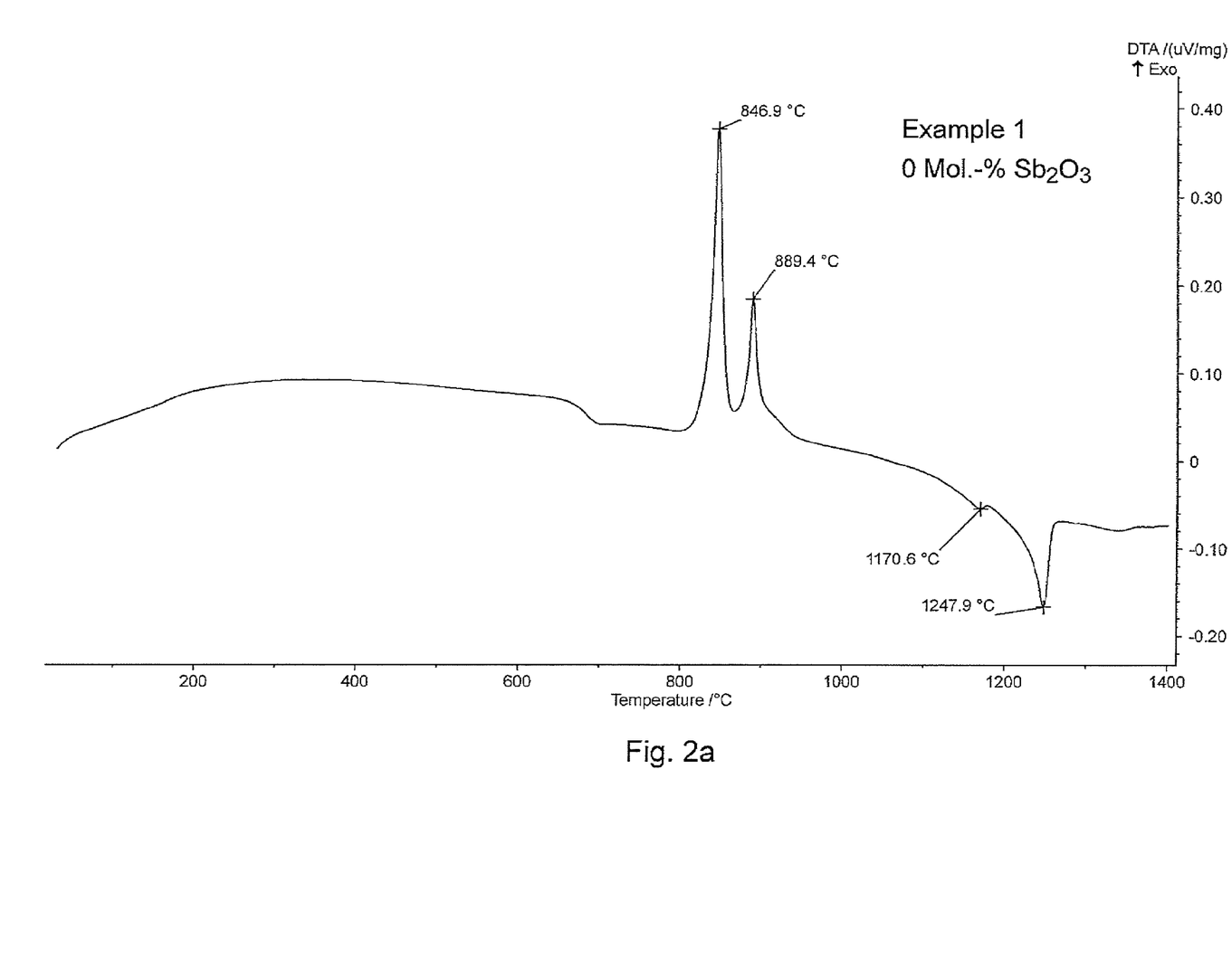
Figure 2B:
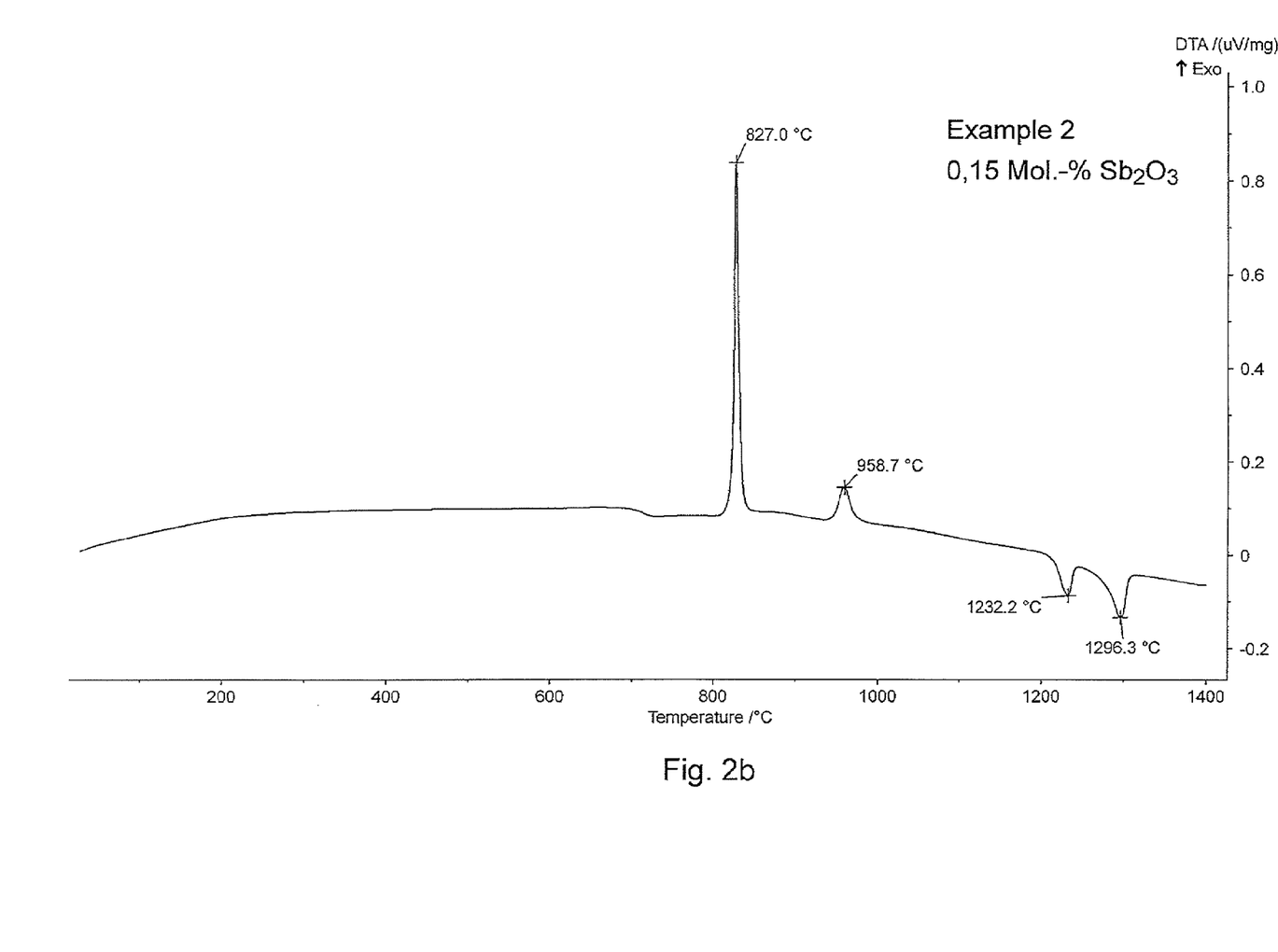
Figure 2C:
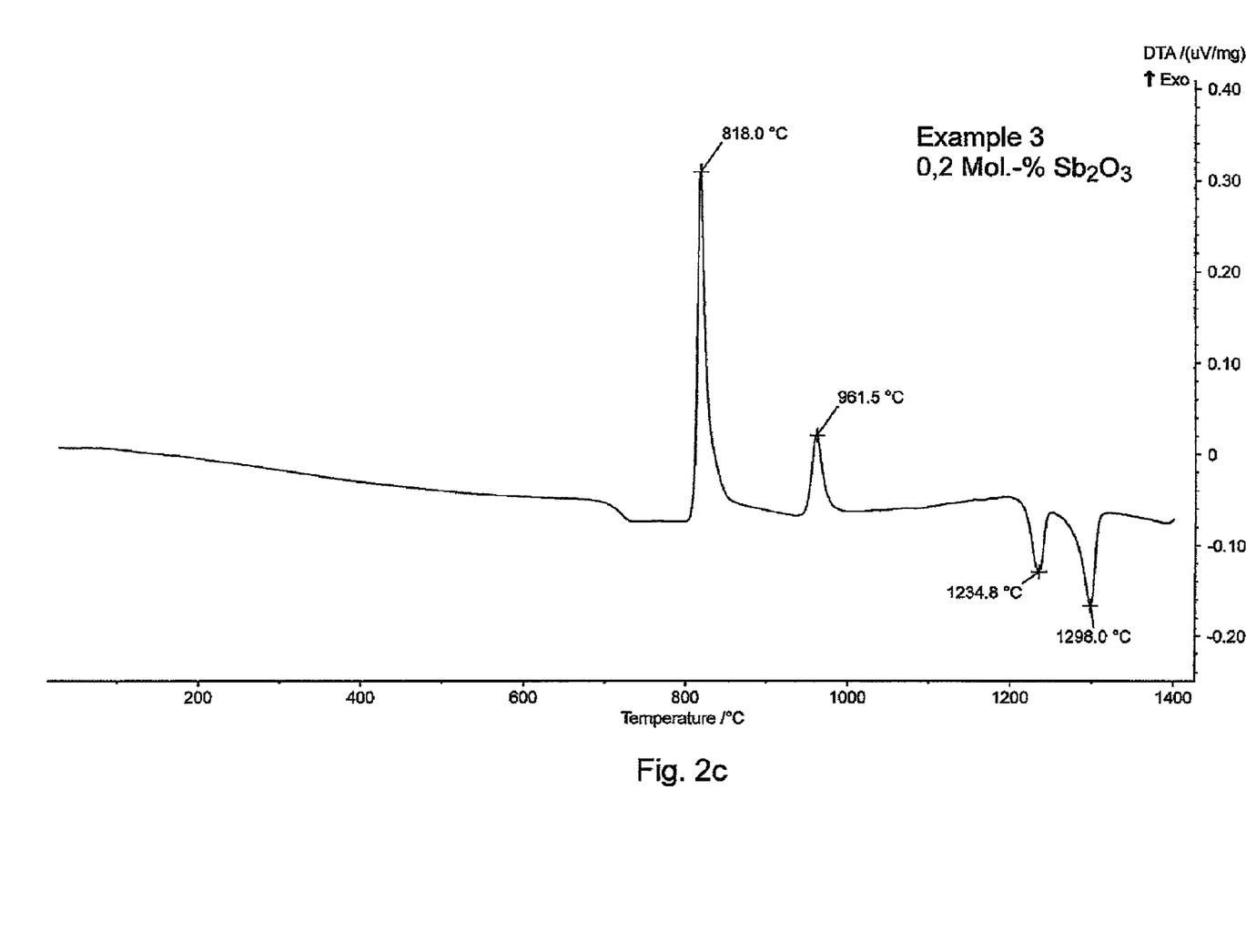

In order to demonstrate the effect of the addition of Sb$_2$O$_3$, three example glasses which respectively contained 0, 0.15 and 0.20 mol % Sb$_2$O$_3$ as additive were produced from the starting materials listed in Table 1 below. For this purpose, the respective starting materials were mixed in a platinum crucible, and a glass was melted and homogenized therefrom at a temperature of 1450° to 1600° C. A homogeneous, clear, transparent glass was obtained after cooling to room temperature. The glasses obtained in this way were then subjected to differential thermoanalysis using a Netzsch STA 409PC differential thermoanalyser. The resulting curves are shown in FIGS. 2*a* to 2*c*. There are two main peaks in all three curves obtained, with the first peak, which occurs at 847, 827 and 818° C. respectively, being the peak for the crystallization of the BaTiO$_3$. The second peak, which occurs at 890, 958 and 961° C. respectively, is the peak for the crystallization of Ba[Al$_2$Si$_2$O$_8$] (hereafter Ba-celsian). It becomes clear from these curves that there is a difference of only about 43 K between the crystallization temperatures without the addition of Sb$_2$O$_3$. However, this difference is increased to about 131 K if just 0.15 mol % Sb$_2$O$_3$ are added, and, if 0.2 mol % Sb$_2$O$_3$ are added, this difference is about 143 K.

On account of this increased temperature difference between the two crystallization temperatures, the addition of Sb$_2$O$_3$ makes it significantly easier to selectively crystallize out BaTiO$_3$ as opposed to Ba-celsian and to thus obtain glass-ceramics having the desired high dielectric constant.

TABLE 1

| | Example number | | | | | |
|---|---|---|---|---|---|---|
| | 1 | | 2 | | 3 | |
| | mol % | % by wt. | mol % | % by wt. | mol % | % by wt. |
| SiO$_2$ | 18.15 | 10.22 | 16.18 | 8.93 | 16.17 | 8.92 |
| Al$_2$O$_3$ | 5.35 | 5.11 | 7.09 | 6.65 | 7.09 | 6.64 |
| B$_2$O$_3$ | 1.75 | 1.14 | 0.00 | 0.00 | 0.00 | 0.00 |
| BaO | 40.00 | 57.49 | 37.84 | 53.33 | 37.82 | 53.25 |
| TiO$_2$ | 34.75 | 26.03 | 37.74 | 27.71 | 37.72 | 27.67 |
| Sb$_2$O$_3$ | 0.00 | 0.00 | 0.15 | 0.39 | 0.20 | 0.53 |
| La$_2$O$_3$ | 0.00 | 0.00 | 1.00 | 2.99 | 1.00 | 2.99 |
| Sum total | 100.00 | 100.00 | 100.00 | 100.00 | 100.00 | 100.00 |

Examples 4 to 6

In a further experiment, three glass-ceramics were produced using the mixtures shown in Table 2 below.

TABLE 2

| | Example number | | | | | |
|---|---|---|---|---|---|---|
| | 4 | | 5 | | 6 | |
| | mol % | % by wt. | mol % | % by wt. | mol % | % by wt. |
| SiO$_2$ | 18.10 | 10.21 | 18.10 | 10.20 | 18.10 | 10.34 |
| Al$_2$O$_3$ | 7.10 | 6.80 | 7.10 | 6.79 | 7.10 | 6.88 |
| B$_2$O$_3$ | 0 | 0 | 0 | 0 | 3.00 | 1.99 |
| BaO | 39.00 | 56.14 | 39.00 | 56.08 | 37.50 | 54.67 |
| TiO$_2$ | 35.80 | 26.85 | 35.80 | 26.83 | 34.26 | 26.03 |
| Sb$_2$O$_3$ | 0 | 0 | 0.04 | 0.10 | 0.04 | 0.10 |
| Sum total | 100.00 | 100.00 | 100.00 | 100.00 | 100.00 | 100.01 |

Preparation

Figure 3:
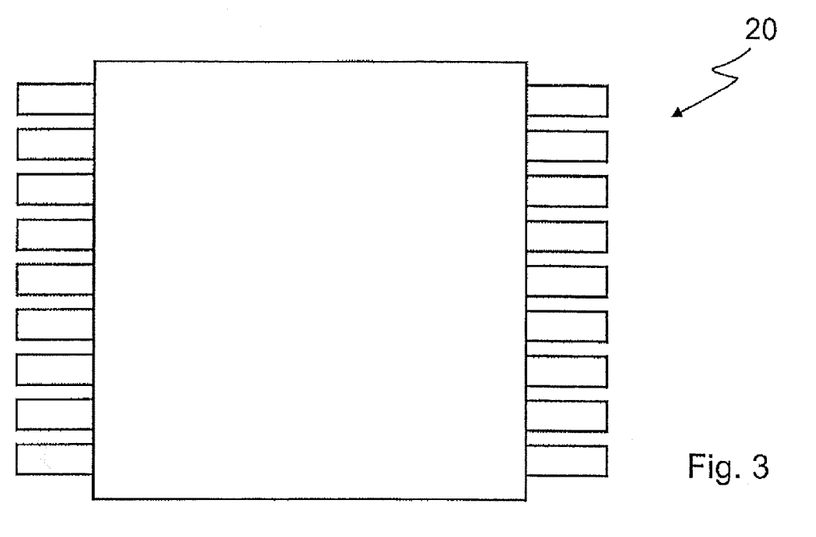
FIG. 3 is a plan view of an SWIR heating unit used for ceramicization.
Figure 4:
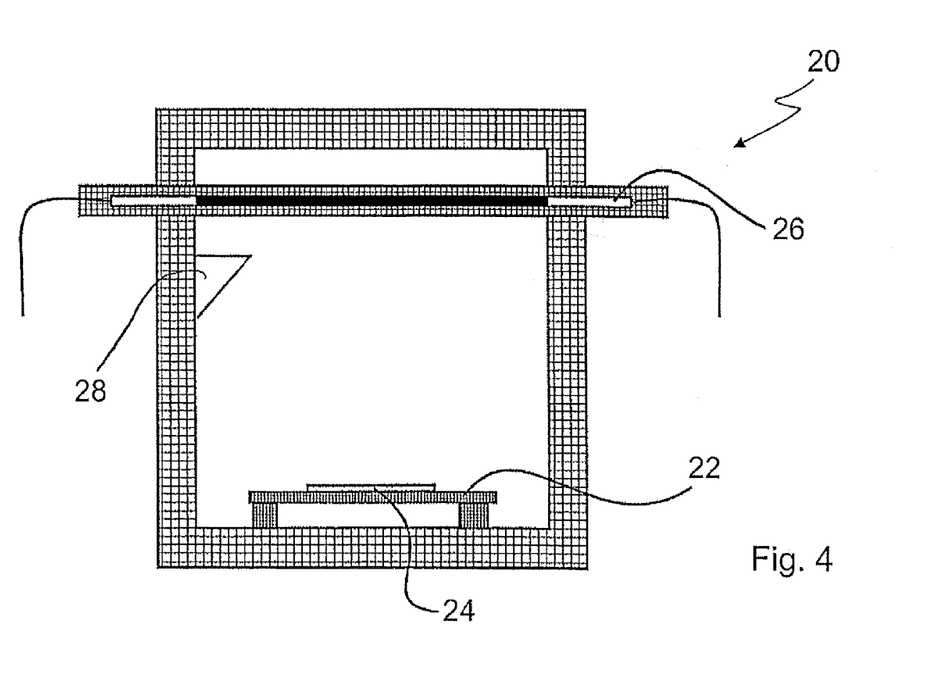
FIG. 4 shows a schematic cross section through the SWIR heating of FIG. 3.

In a platinum crucible a glass was melted from the respective starting materials (cf. Table 2) at a temperature of about 1450 to 1600° C. and homogenized. A homogeneous, clear, transparent glass was obtained after cooling to room temperature. Samples which were to be ceramicized in the form of plates having a diameter of 60 mm and a thickness of 0.5 mm were separated from said glass. Glass samples of this type were placed into an IR surface heating unit (see Table 3 for technical data), as shown schematically in FIGS. 3 and 4. The SWIR surface heating unit (shortwave infrared heating unit), denoted in FIGS. 3 and 4 in its entirety by reference numeral 20, is heated using shortwave infrared radiant heaters 26 as per Table 3. The radiators 26 are arranged under the ceiling area parallel to the width of the unit. A suitable support 22 made from a high-temperature-stable material which is highly absorptive or highly diffractive for IR radiation is arranged at the base of the SWIR surface heating unit 20. By way of example, this may be Al$_2$O$_3$, quartz glass or Quarzal, preferably in powder form. The samples 24 of the starting glass which are to be ceramicized are placed on the support 22.

Figure 5:
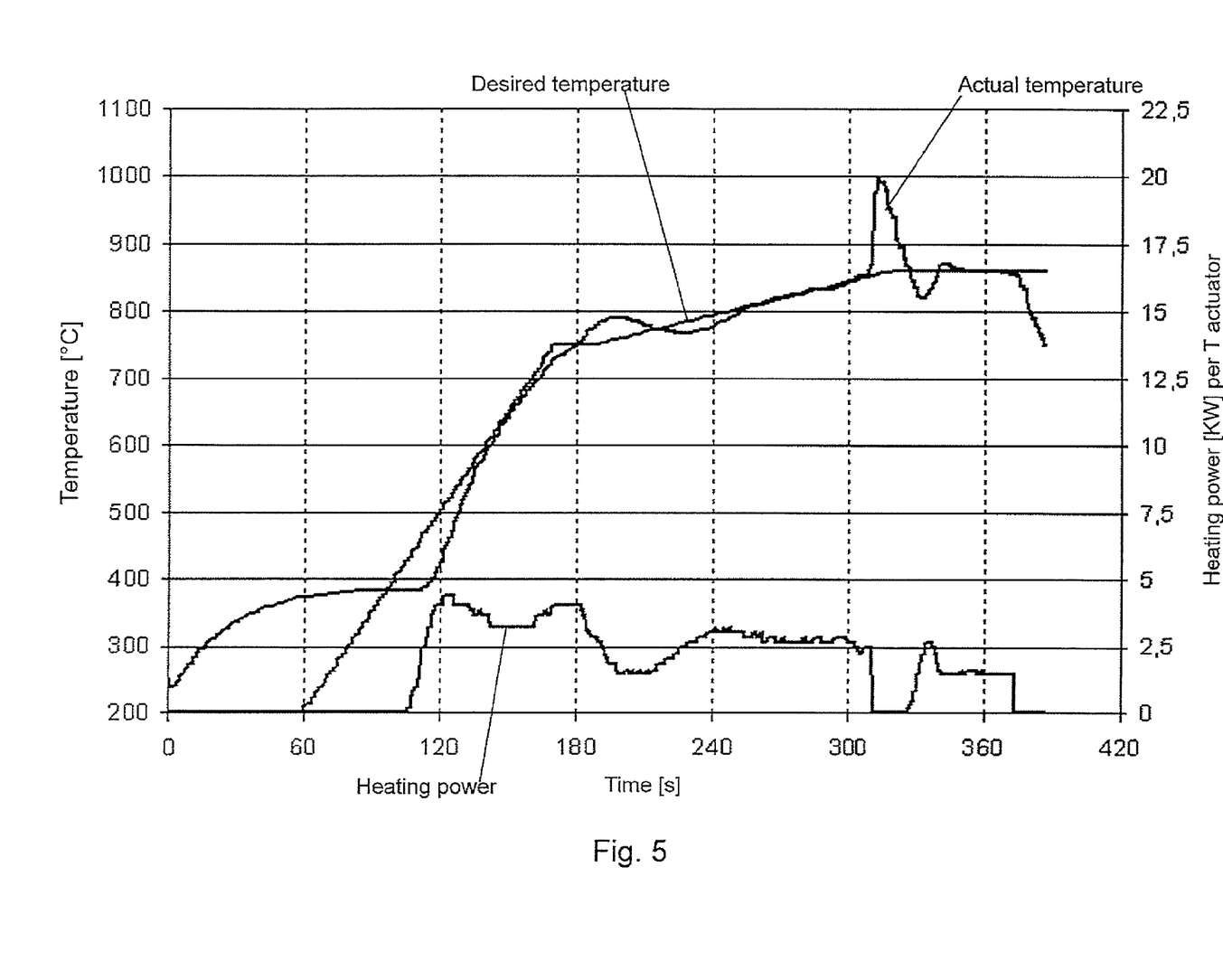
FIG. 5 shows a graph representing the heating profile for ceramicizing the glass phases of Examples 4 to 6.

The glasses were then subjected to ceramicization according to the temperature profile shown in FIG. 5. The ceramicization was carried out under PID control with the aid of a pyrometer 28, which measures the surface temperature of the sample. It was thereby possible to keep the actual temperature of the sample in wide ranges in the region of the desired temperature. The actual-temperature peak occurring shortly after 300 s is caused by the thermal energy released by the beginning crystallization of the BaTiO$_3$. In order to counteract excessive heating of the sample and thus prevent excessive crystallization of Ba-celsian, at this point in time the control had switched off the IR radiation completely, until the surface temperature of the sample returned to the desired value again. When latent heat is no longer released from the crystallization, the heating unit switches back on automatically in order to reach the desired temperature. After complete ceramicization (about 1 minute), the sample is rapidly cooled to a temperature below 800° C. (650° C.-800° C.) and then cooled to room temperature at a rate of about 10 K/min. The latter serves to obtain materials which are as free from mechanical stresses as possible.

TABLE 3

| Unit: | SWIR surface heating unit |
|---|---|
| Dimensions (w × d × h): | 450 mm × 370 mm × 345 mm (internal dimensions from wall to wall) |
| Material of walls: | Quarzal all-round, wall thickness 30 mm |
| Thermal insulation: | None |
| Radiator type: | Twin tube radiator 33 × 15 mm$^2$ |
| Radiator arrangement: | Under the ceiling area, parallel to the width of the unit |
| Number of radiators: | 9 |
| Helix per radiator: | 2 |
| Power per helix: | 8.4 kW |
| Colour temperature: | 3000 K |

Figure 6:
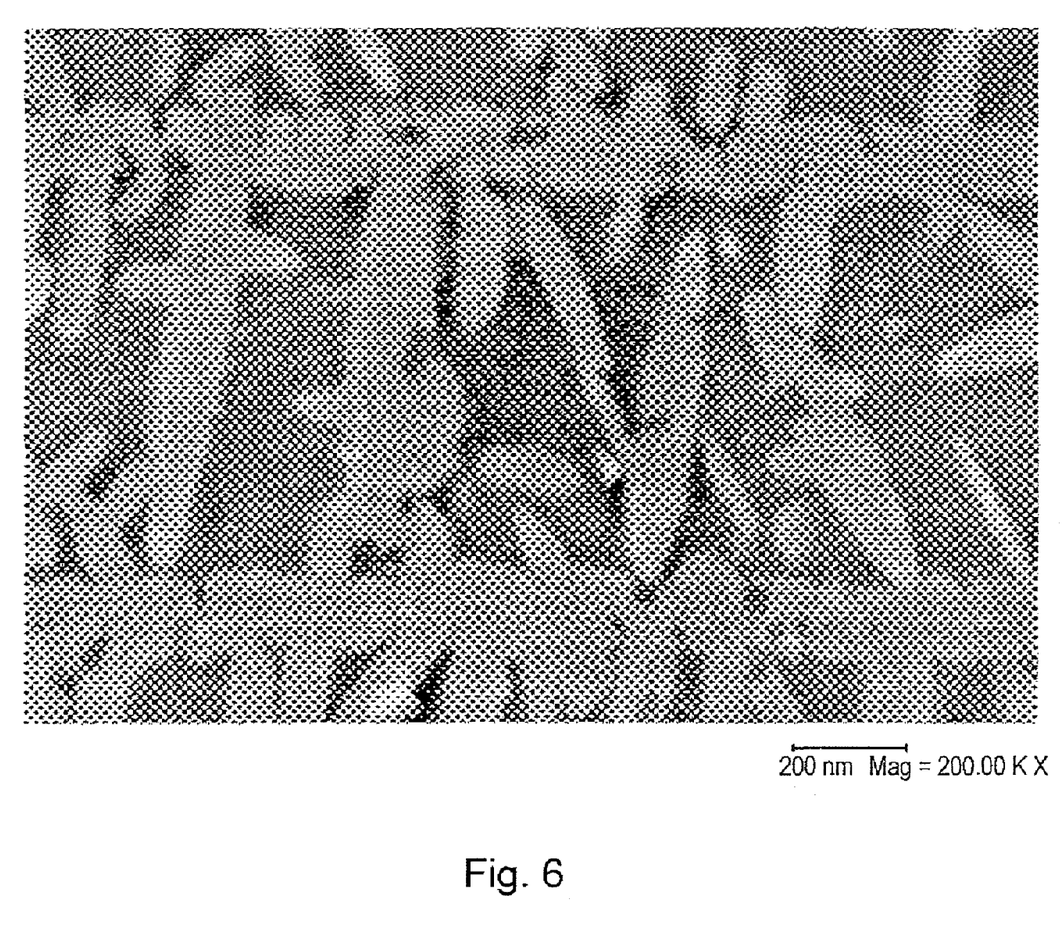
FIG. 6 shows a scanning electron microscope (SEM) image of the glass-ceramic of Example 4.

FIG. 6 shows a scanning electron microscope image (SEM image) of the glass-ceramic obtained according to Example 4. For the SEM measurement, the sample was ground on the surface and a layer of carbon approximately 10 nm thick was vapour-deposited thereon. The sample was then investigated using a Zeiss Gemini 1530 scanning electron microscope. In this illustration, the individual crystallites are shown as light areas firmly embedded in the darker glass phase. The volumetric content of the perovskite phase is about 70% ($\eta \approx 0.7$).

It is clear from this illustration that the BaTiO$_3$ crystallizes as needle-shaped crystals having lengths of about 200 nm and a diameter of about 50 nm. Here, the diameter of the BaTiO$_3$ crystals is in an order of magnitude corresponding substantially to an individual ferroelectric domain, and therefore these can easily orient themselves in an external electric field purely by thermal fluctuations. This results in the desired high dielectric constant and is also often referred to as a superparaelectric effect.

Figure 7:
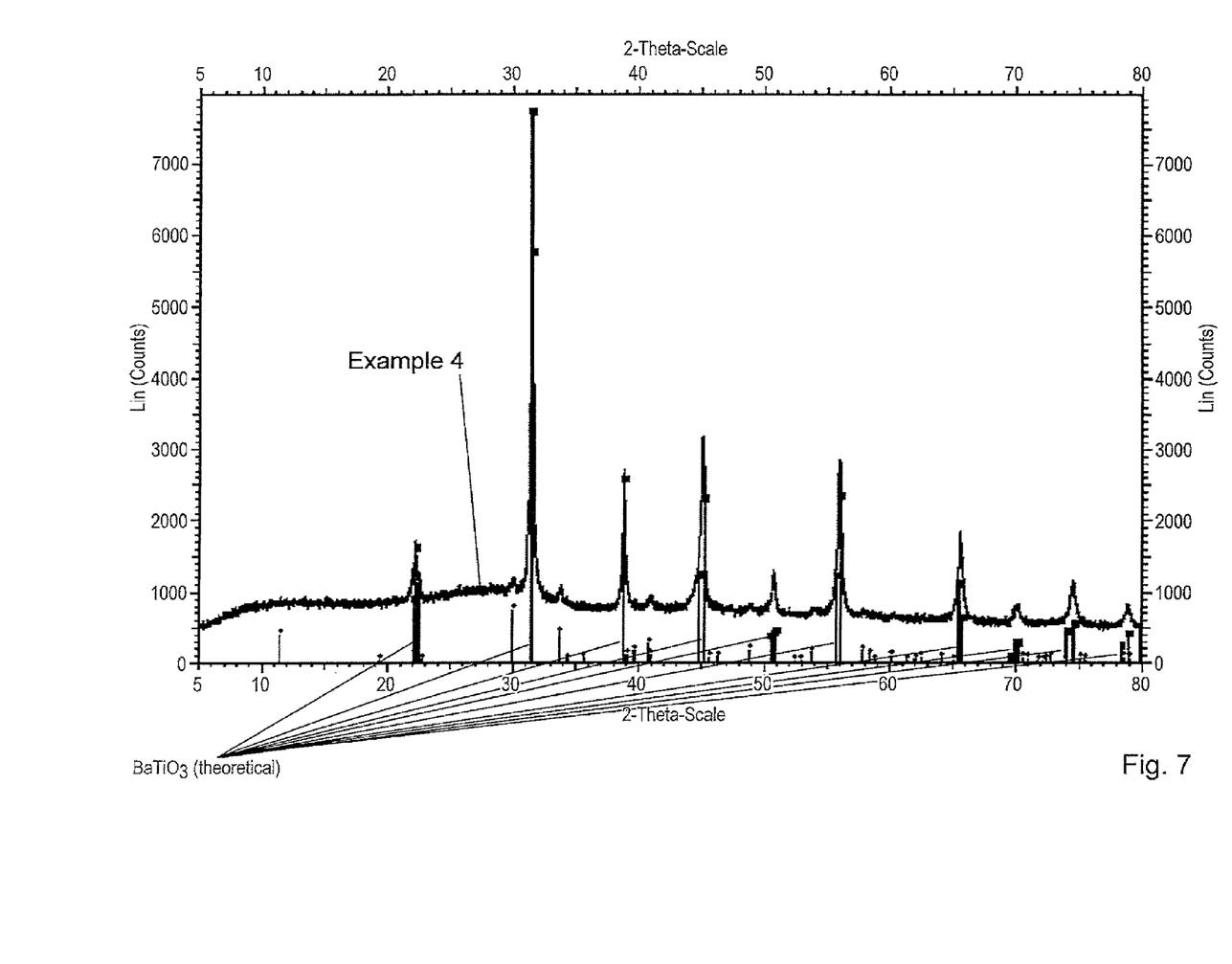
FIG. 7 shows an X-ray diffraction (XRD) analysis of the glass-ceramic of Example 4.

FIG. 7 shows an X-ray diffraction analysis of the glass-ceramic from Example 4. The spectrum obtained is shown here as a curve, while the theoretical peaks for BaTiO$_3$ are shown beneath the curve. The X-ray spectrum of the sample was recorded using a Panalytical X' pert Pro X-ray diffractometer. The comparison of the spectrum obtained with the theoretical spectrum of BaTiO$_3$ shows that BaTiO$_3$ forms the dominant crystal phase in the sample, as desired.

Figure 8:
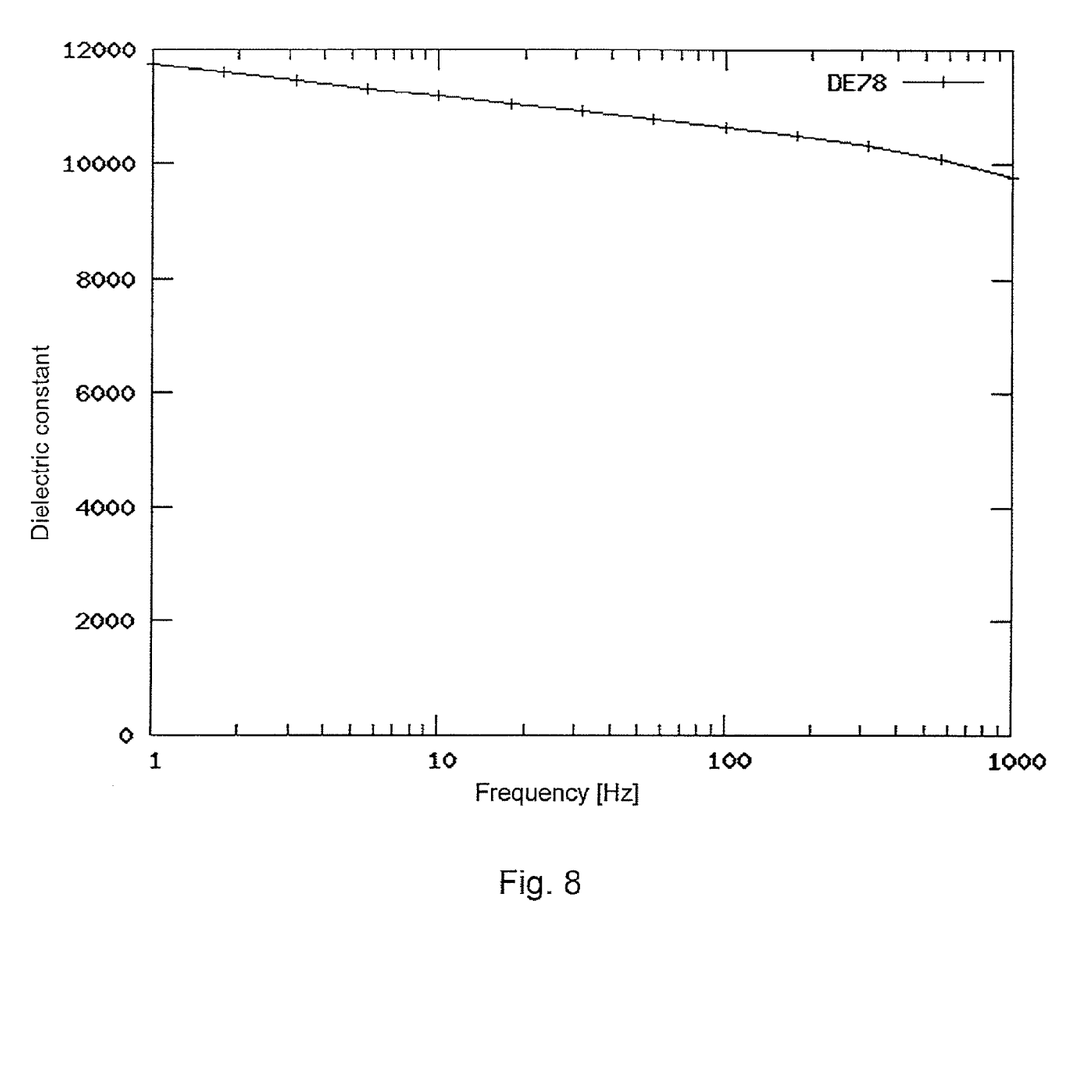
FIG. 8 shows a graph in which the dielectric constant of the glass-ceramic of Example 4 is plotted against frequency at room temperature.

In FIG. 8, the dielectric constant ($\in'$) of the glass-ceramic from Example 4 is plotted against frequency. It is clear from this graph that values greater than 10 000 can be achieved for the dielectric constant depending on the frequency, and that the course of the dielectric constant is also relatively flat. The relatively severe drop of the curve in the region of 1 kHz is thereby not a property of the material, but only an artefact caused by the measurement apparatus. In order to measure the dielectric constant, small sheets of the glass-ceramic from Example 4 having a diameter of 20-40 mm and a thickness of about 0.5 mm were contacted on both sides with conductive silver paint. An impedance analyser (alpha Analyzer from Novocontrol) was used to determine the capacitance and the dielectric loss as a function of frequency. At high frequencies, the impedance $|Z| \sim 1/(\omega C)$ with the angular frequency $\omega$ and the capacitance C is so low that very high currents occur. This results in the apparent drop in $\in'$ at high frequencies.

Figure 9A:
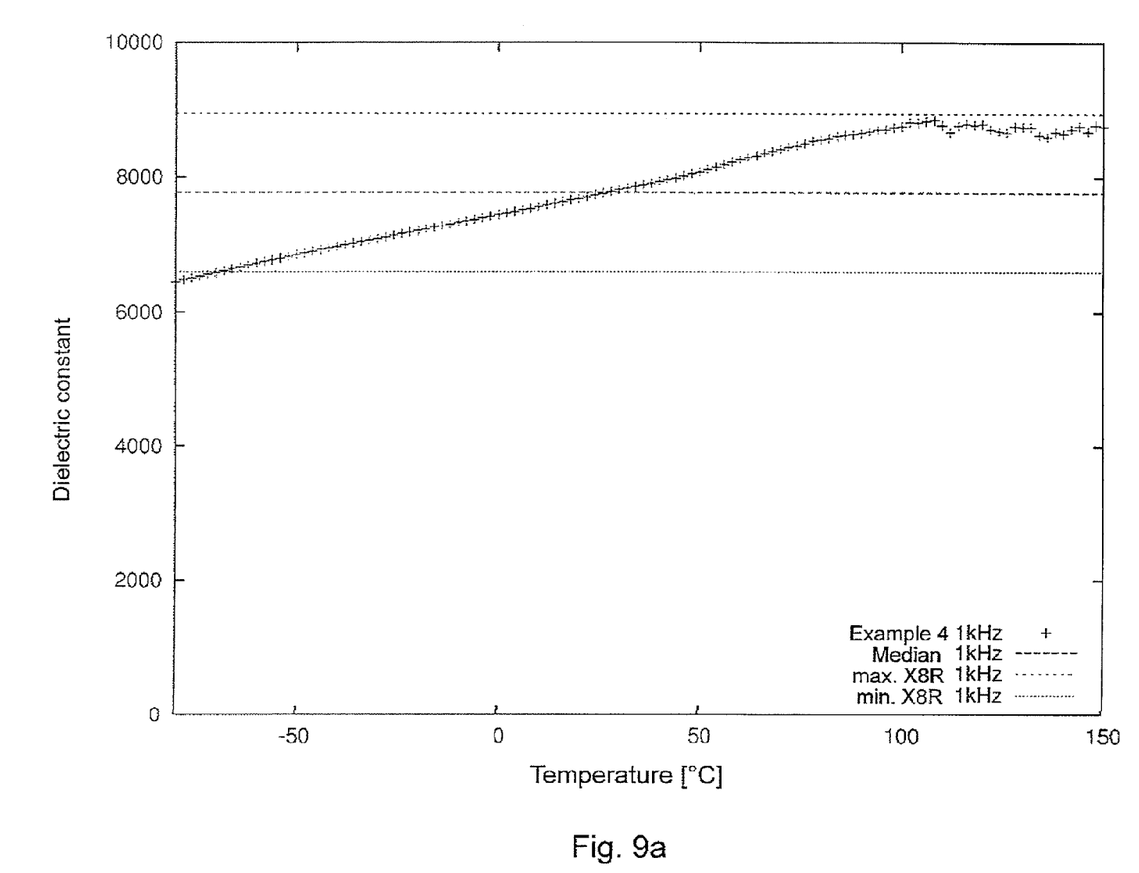

In FIG. 9a, the dielectric constant of the glass-ceramic from Example 4 is plotted as a function of temperature. In order to measure these properties, the sample was placed in a cryostat with temperature control, and the impedance was measured as described above. It can be seen from this curve that the dielectric constant in a temperature range of −55 to 150° C. displays a very flat temperature response and deviates only by values of ±15% from the median. The glass-ceramic of Example 4 thus complies with the electronic standard for capacitor materials X8R.

Figure 9B:
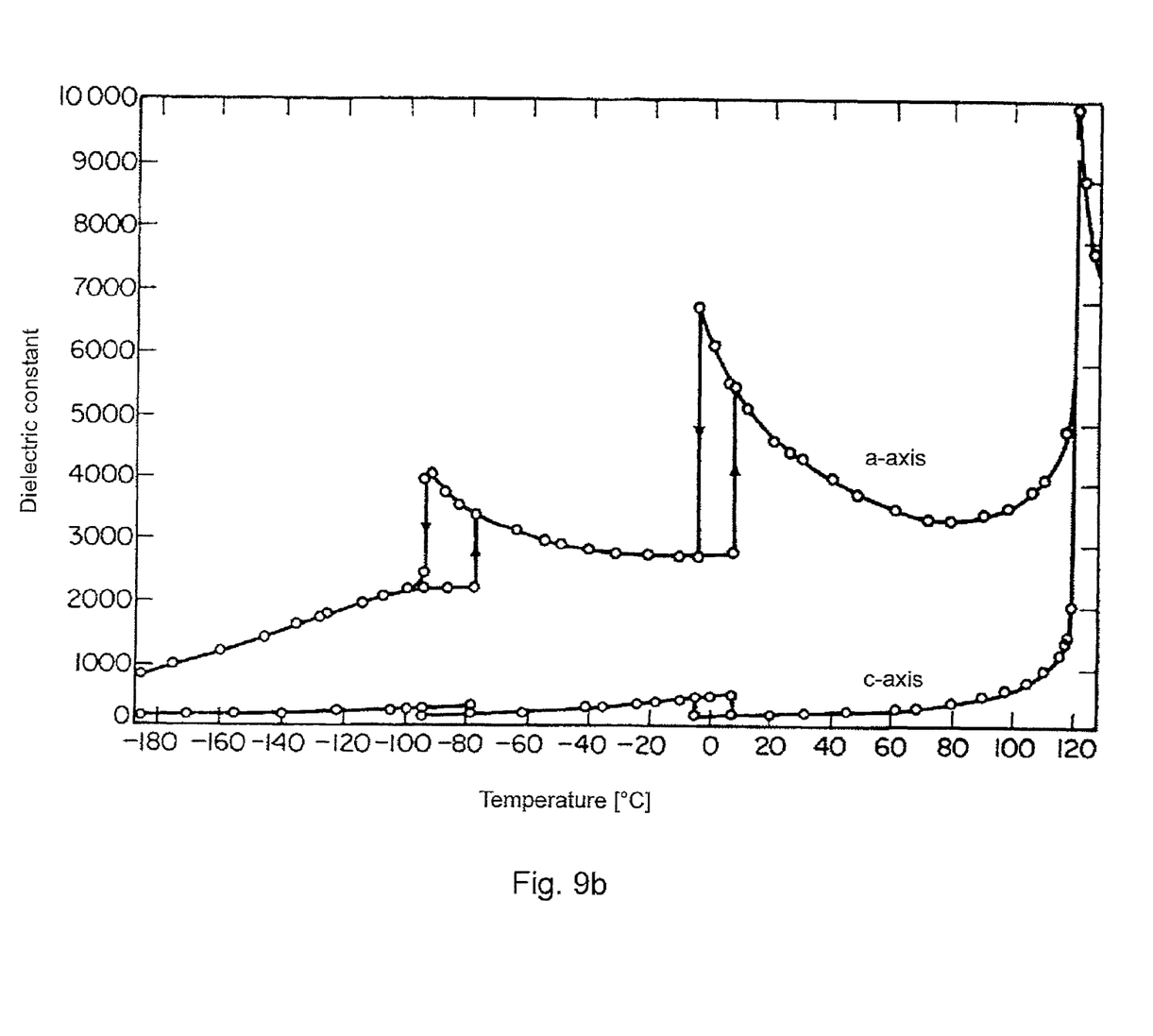

For comparison, in FIG. 9b the course of the dielectric constant is plotted against temperature for a single crystal of pure BaTiO$_3$ (source: B. Jaffe, W. R. Cook, H. Jaffe; *Piezoelectric ceramics*, Academic Press, London, 1971, p. 53). In contrast to the glass-ceramic comprising nanocrystalline BaTiO$_3$, the single crystal displays a considerably less flat temperature profile of the dielectric constant owing to the changes in the crystal lattice which occur at different temperatures, with sharp peaks occurring in the dielectric constant, which are undesirable in electronic circuits exposed to different temperatures, particularly at the transition from the rhombohedral structure to the orthorhombic structure in the region of −100° C. and at the transition from the orthorhombic structure to the tetragonal structure at about 0° C.

What is claimed is:

1. A glass-ceramic comprising, as main crystalline phase, a perovskite phase of the following formula: $Ba_{1-x}Z^1_xTi_{1-y}Z^2_yO_3$, in which $Z^1$ is an element selected from the group consisting of Sr, Ca, Ce, Pb, La and Sm, in which $Z^2$ is an element selected from the group consisting of Zr, Hf, Nb, V, Y, Sc and Ta, and in which x and y are each independently of one another 0<x,y<0.5, whereby the size of crystallites is in the range of 10 nm to 50 μm, said glass ceramic further comprising 0.01 to 3 mol % of an oxide selected from the group consisting of $Sb_2O_3$, $As_2O_3$ and $Bi_2O_3$.

2. The glass-ceramic of claim 1, wherein a volumetric content η of the perovskite phase is 0.3<η<0.95.

3. The glass-ceramic of claim 1, comprising 0.1 to 1 mol % of said at least one oxide selected from the group consisting of $Sb_2O_3$, $As_2O_3$ and $Bi_2O_3$.

4. The glass-ceramic of claim 1, further comprising at least one oxide selected from the group consisting of $P_2O_5$ and $B_2O_3$.

5. The glass-ceramic of claim 1, having a dielectric constant of $\in'>4000$.

6. The glass-ceramic of claim 1, having a dielectric loss angle at 10 kHz of tan δ<5·10$^{-2}$.

7. The glass-ceramic of claim 1, having a dielectric strength given a thickness of 100 μm of >20 kV/mm.

8. An electronic component comprising a dielectric, whereby the dielectric comprises a glass-ceramic of claim 1.

9. The electronic component of claim 8, selected from the group consisting of capacitors, frequency filters and antennas.

10. The electronic component of claim 9, whereby said capacitor is a high-performance capacitor.

11. The glass-ceramic of claim 3, comprising 0.1 to 0.5 mol % of said at least one oxide selected from the group consisting of $Sb_2O_3$, $As_2O_3$ and $Bi_2O_3$.

12. The glass-ceramic of claim 5, having a dielectric constant of $\varepsilon'>6000$.

13. The glass-ceramic of claim 12, having a dielectric constant of $\varepsilon'>8000$.

14. The glass-ceramic of claim 6, having a dielectric loss angle at 10 kHz of $\tan\delta<2\cdot10^{-2}$.

15. The glass-ceramic of claim 7, having a dielectric strength given a thickness of 100 μm of >100 kV/mm.

16. The glass-ceramic of claim 1, wherein x and y are independently of one another $0\leq x,y\leq 0.1$.

17. The glass-ceramic of claim 1, wherein the size of crystallites is in the range of 100 nm to 1 μm.

18. The glass-ceramic of claim 16, wherein the size of crystallites is in the range of 100 nm to 1 μm.

* * * * *

UNITED STATES PATENT AND TRADEMARK OFFICE
CERTIFICATE OF CORRECTION

PATENT NO. : 8,263,509 B2
APPLICATION NO. : 12/793834
DATED : September 11, 2012
INVENTOR(S) : Bernd Hoppe et al.

It is certified that error appears in the above-identified patent and that said Letters Patent is hereby corrected as shown below:

Column 8,
Line 43 (Claim 1), "$0< x,y <0.5$" should be -- $0 \leq x,y \leq 0.5$ --.
Line 48 (Claim 2), "$0.3<\eta<0.95$" should be -- $0.3 \leq \eta \leq 0.95$ --.

Signed and Sealed this
Twenty-seventh Day of November, 2012

David J. Kappos
*Director of the United States Patent and Trademark Office*